US008149102B1

(12) United States Patent
Miller et al.

(10) Patent No.: US 8,149,102 B1
(45) Date of Patent: Apr. 3, 2012

(54) RECONFIGURABLE INTERFACE OPERABLE WITH MULTIPLE TYPES OF SENSORS AND ACTUATORS

(75) Inventors: Matthew Miller, Grass Valley, CA (US); Alan S. Broad, Palo Alto, CA (US)

(73) Assignee: Memsic Transducer Systems Co., Ltd., Wuxi, Jiangsu Province (CN)

( * ) Notice: Subject to any disclaimer, the term of this patent is extended or adjusted under 35 U.S.C. 154(b) by 578 days.

(21) Appl. No.: 12/410,746

(22) Filed: Mar. 25, 2009

Related U.S. Application Data

(60) Provisional application No. 61/039,859, filed on Mar. 27, 2008.

(51) Int. Cl.
*G08B 29/00* (2006.01)
(52) U.S. Cl. ............... 340/506; 340/539.1; 340/602
(58) Field of Classification Search ............ 340/506, 340/539.1, 602, 509, 512, 516, 517, 511, 340/501, 146.2, 526, 531, 527, 538.15
See application file for complete search history.

(56) References Cited

U.S. PATENT DOCUMENTS

| | | | |
|---|---|---|---|
| 4,002,886 A | 1/1977 | Sundelin | |
| 4,418,333 A | 11/1983 | Schwarzbach et al. | |
| 4,766,295 A | 8/1988 | Davis et al. | |
| 5,352,957 A | 10/1994 | Werner | |
| 5,365,154 A | 11/1994 | Schneider et al. | |
| 5,640,151 A | 6/1997 | Reis et al. | |
| 5,697,061 A | 12/1997 | Krueger et al. | |
| 5,841,365 A | 11/1998 | Rimkus | |
| 5,995,015 A | 11/1999 | DeTemple et al. | |
| 6,032,109 A | 2/2000 | Ritmiller, III | |
| 6,037,704 A * | 3/2000 | Welle | 310/339 |
| 6,078,269 A | 6/2000 | Markwell et al. | |
| 6,208,247 B1 | 3/2001 | Agre et al. | |
| 6,243,654 B1 | 6/2001 | Johnson et al. | |
| 6,339,373 B1 * | 1/2002 | Zeskind et al. | 340/534 |
| 6,381,467 B1 | 4/2002 | Hill et al. | |
| 6,392,562 B1 | 5/2002 | Boston et al. | |
| 6,587,739 B1 | 7/2003 | Abrams et al. | |
| 6,690,289 B1 | 2/2004 | Odinak et al. | |
| 6,745,027 B2 | 6/2004 | Twitchell, Jr. | |
| 6,749,116 B2 | 6/2004 | Massaro | |

(Continued)

OTHER PUBLICATIONS

"IEEE Standard for a Smart Transducer Interface for Sensors and Actuators—Transducers to Microprocessor Communication Protocols and Transducers Electronic Data Sheet (TEDS) Formats", IEEE Standards 1451.2-1997, IEEE Instrumentation and Measurement Society, 1998, 125 Pages.

(Continued)

*Primary Examiner* — Daniel Previl
(74) *Attorney, Agent, or Firm* — Weingarten, Schurgin, Gagnebin & Lebovici LLP

(57) ABSTRACT

An interface is provided that configures itself dynamically based on sensor information received from a sensor assembly or actuator information received from an actuator assembly. The interface may be configured to interoperate with sensor assemblies including analog transducers, smart transducers providing digital outputs and various actuators. The sensor information or the actuator information may include information for managing power consumption associated with the operation of the sensor or the actuator. Using the sensor information or the actuator information, a power management scheme may be implemented to reduce power consumption and extend the operational time of a module. The sensor information also includes information about the sensor signal generated by the sensor. The information about the sensor signal allows the module to interoperate with more diverse types of sensors.

23 Claims, 9 Drawing Sheets

U.S. PATENT DOCUMENTS

| | | |
|---|---|---|
| 6,750,769 B1 | 6/2004 | Smith |
| 6,822,568 B2 | 11/2004 | Gehlot et al. |
| 6,844,821 B2 | 1/2005 | Swartzel et al. |
| 6,859,831 B1 | 2/2005 | Gelvin et al. |
| 6,961,709 B2 | 11/2005 | Goodwin, III |
| 7,035,240 B1 | 4/2006 | Balakrishnan et al. |
| 7,090,125 B2 | 8/2006 | Goel et al. |
| 7,103,511 B2 | 9/2006 | Petite |
| 7,152,040 B1 | 12/2006 | Hawthorne et al. |
| 7,176,808 B1 | 2/2007 | Broad et al. |
| 7,231,180 B2 | 6/2007 | Benson et al. |
| 7,360,095 B2 | 4/2008 | Girouard et al. |
| 7,369,047 B2 | 5/2008 | Broad et al. |
| 7,397,368 B2 | 7/2008 | Otto et al. |
| 7,424,527 B2 | 9/2008 | Petite |
| 7,429,936 B2 | 9/2008 | Paradiso et al. |
| 7,440,735 B2 | 10/2008 | Karschnia et al. |
| 7,903,809 B2 * | 3/2011 | Karam .................. 379/413 |
| 2003/0025599 A1 | 2/2003 | Monroe |
| 2003/0043028 A1 | 3/2003 | Torikai et al. |
| 2003/0063585 A1 | 4/2003 | Younis et al. |
| 2004/0010492 A1 | 1/2004 | Zhao et al. |
| 2004/0098218 A1 * | 5/2004 | Ito et al. ................ 702/138 |
| 2004/0122833 A1 | 6/2004 | Forth et al. |
| 2004/0233284 A1 | 11/2004 | Lesesky et al. |
| 2005/0099500 A1 | 5/2005 | Fujita |
| 2005/0131736 A1 | 6/2005 | Nelson et al. |
| 2005/0218218 A1 | 10/2005 | Koster |
| 2005/0237153 A1 | 10/2005 | Chen |
| 2006/0130142 A1 | 6/2006 | Mester et al. |
| 2006/0176239 A1 | 8/2006 | Sweeney |
| 2006/0187040 A1 | 8/2006 | Sweeney |
| 2006/0220843 A1 | 10/2006 | Broad et al. |
| 2006/0229086 A1 | 10/2006 | Broad et al. |
| 2006/0271667 A1 | 11/2006 | Clow et al. |
| 2007/0132846 A1 | 6/2007 | Broad et al. |
| 2007/0291689 A1 | 12/2007 | Kapur et al. |
| 2008/0027586 A1 * | 1/2008 | Hern et al. .................. 700/284 |
| 2008/0116387 A1 * | 5/2008 | Astley et al. ............ 250/370.15 |

OTHER PUBLICATIONS

IEEE Standards for a Smart Transducer Interface for Sensors and Actuators—Mixed-Mode Communication Protocols and Transducer Electronic Data Sheet (TEDS) Formats, IEEE Standards 1451.4-2004, IEEE Instrumentation and Measurement Society, 2004, 439 Pages.

Crossbow Technology, "Xmesh Network Layer," 2006, 1 page.

U.S. Patent Appl. No. 11/930,832, filed Oct. 31, 2007, 38 Pages.

U.S. Patent Appl. No. 11/152,350, filed Jun. 13, 2005, 33 Pages.

* cited by examiner

RECONFIGURABLE INTERFACE OPERABLE WITH MULTIPLE TYPES OF SENSORS AND ACTUATORS

CROSS-REFERENCE TO RELATED APPLICATIONS

This application claims priority under 35 U.S.C. §119(e) from co-pending U.S. Provisional Patent Application No. 61/039,859 entitled "Sensor Interface for Low-Power Nodes in a Wireless Sensor Network," filed on Mar. 27, 2008, which is incorporated by reference herein in its entirety. This application is related to U.S. Pat. No. 8,005,108 entitled "Fast Deployment of Modules in Adaptive Network"; U.S. patent application Ser. No. 11/433,194 entitled "Adaptive Network and Method," filed on May 11, 2006 which published as U.S. Publication 2007/0132846; U.S. Pat. No. 7,760,109 entitled "Interactive Surveillance-Network and Method"; U.S. patent application Ser. No. 11/152,350 entitled "Adaptive Surveillance Network and Method," filed on Jun. 13, 2005 which published as U.S. Publication 2010/0013933; and U.S. Pat. No. 7,705,729 entitled "Surveillance System and Method," all of which are incorporated by reference herein in their entirety.

BACKGROUND OF THE INVENTION

1. Field of the Invention

This invention relates to an interface in a wireless network module capable of connecting to various types of sensors or actuators, more specifically to an interface configurable according to sensor information or actuator information received from a sensor assembly or an actuator assembly.

2. Background of the Invention

An adaptive network such as wireless sensor networks (WSNs) is a network of interactive modules communicating via wireless links that can self-adapt in accordance with changing transmission conditions. The adaptive network has found applications in fields that require deployment of modules over a wide area for a prolonged time, often operating with constrained power sources. In the adaptive wireless networks, the radio range of each individual interactive module is extended by forwarding messages to neighboring interactive modules which in turn relay the messages to other interactive modules. An example of the WSN is described in U.S. patent application Ser. No. 11/095,640 entitled "Surveillance System and Method," filed on Mar. 30, 2005, which is incorporated by reference herein in its entirety.

The modules in the WSN may be coupled to various types of sensors to collect information about environment in which the modules are deployed. The sensors may be installed internally within the modules or be installed external to the modules and connected to the modules via, for example, cables. In order to expand the applicable fields of use, it is advantageous to allow the modules in the WSN to interface with different types of sensors.

Conventional interface systems as defined in IEEE 1451.4, for example, allow modules to interoperate with different types of sensors by using Transducer Electronic Data Sheet (TEDS). Such conventional interface system produces less than optimal results when used in the modules of the WSN. The modules of the WSN are generally powered by constrained energy sources such as batteries or solar panels. Because the energy is constrained, the modules must make efficient use of the energy to extend the operational life of the module. Conventional interface systems, however, do not provide mechanisms for reducing power consumption. The increased power consumption due to such conventional interface systems shortens the operational time of the devices.

SUMMARY OF THE INVENTION

Embodiments provide a module, a method and a network for interfacing with a plurality types of sensors assemblies or actuator assemblies. The sensor assemblies may include sensors of different characteristics. The actuator assemblies may also include actuators of different characteristics. The module includes an interface that configures itself depending on the type of sensor assembly or actuator assembly coupled to the interface. The sensor assembly sends sensor information representing characteristics of the sensor (e.g., the type of sensor) to the module. The actuator assembly sends actuator information representing characteristics of the actuator to the module. Responsive to receiving the sensor information or the actuator information, the module configures the interface to interface with the sensor assembly or the actuator assembly.

In one embodiment, the interface is configured to connect to a first sensor assembly including a first sensor and a second sensor assembly including a second sensor. The first sensor generates an analog sensor signal. The second sensor generates a digital sensor signal. The same port in the interface may interface with sensor assemblies having different types of sensors.

In one embodiment, the module includes a processor for generating a control signal responsive to receiving the sensor information or the actuator information. The interface includes a plurality of switches that is turned on or off based on the control signal. By turning on or turning off a different set of switches, the interface may operate with different types of sensors or actuators.

In one embodiment, the sensor information or the actuator information includes data for managing power consumption of the sensor assembly or the actuator assembly. The sensor information or the actuator information includes power source information indicating the type of power source required to activate the sensor or the actuator.

In one embodiment, the sensor information comprises initialization information representing a time required for initializing the sensor in the sensor assembly, and measure time information representing a time required for the sensor to return the sensor signal. The initialization information and the measure time information allow the module to manage power consumption associated with collecting the sensor signal from the sensor.

In one embodiment, the module is coupled to a sensor assembly including a sensor that generates a pulse signal responsive to detecting a predetermined event. The pulse signal may be provided as an interrupt signal to a processor in the module to wake up the processor from a power-save mode.

In one embodiment, the module is part of an adaptive network that communicates with a receiving module intermittently to conserve power. The module sends sensor data and at least a part of the sensor information to a receiving module. The receiving module processes the sensor data based on the part of the sensor information.

The features and advantages described in the specification are not all inclusive and, in particular, many additional features and advantages will be apparent to one of ordinary skill in the art in view of the drawings, specification, and claims.

Moreover, it should be noted that the language used in the specification has been principally selected for readability and instructional purposes.

DETAILED DESCRIPTION OF THE INVENTION

Embodiments described herein provide an interface in a module that configures itself dynamically based on sensor information or actuator information received from a sensor assembly or an actuator assembly. The interface may be configured to interoperate with sensor assemblies including analog transducers, smart transducers providing digital outputs and various actuators. The sensor information or the actuator information may include information for managing power consumption associated with the operation of the sensor or the actuator. Using the sensor information or the actuator information, a power management scheme may be implemented to reduce power consumption and extend the operational time of a module. The sensor information also includes information about the sensor signal generated by the sensor. The information about the sensor signal allows the module to interoperate with more diverse types of sensors.

The sensor information represents information about characteristics of sensors. The sensor information includes, among other information, the type of sensor, the initialization time of the sensor, the time needed for the sensor to return the sensor signal, and the type of power source required to operate the sensor.

The actuator information represents information about characteristics of actuators. The actuator information includes, among other information, the type of actuator, and the type of power source required to operate the actuator.

The sensor signal represents information of physical properties detected at the sensor. For example, a humidity sensor provides humidity information as the sensor signal, and a temperature sensor provides temperature information as the sensor signal. The sensor signal may be an analog signal, a digital signal, a pulse signal or any combination thereof.

An actuator signal represents information for controlling the actuator to effect physical changes in the environment. For example, the actuator signal may indicate the speed of a motor, toggling of modes of a relay and switching on or off a lamp.

Example Structure of a Module in a Wireless Sensor Network

Figure 1:
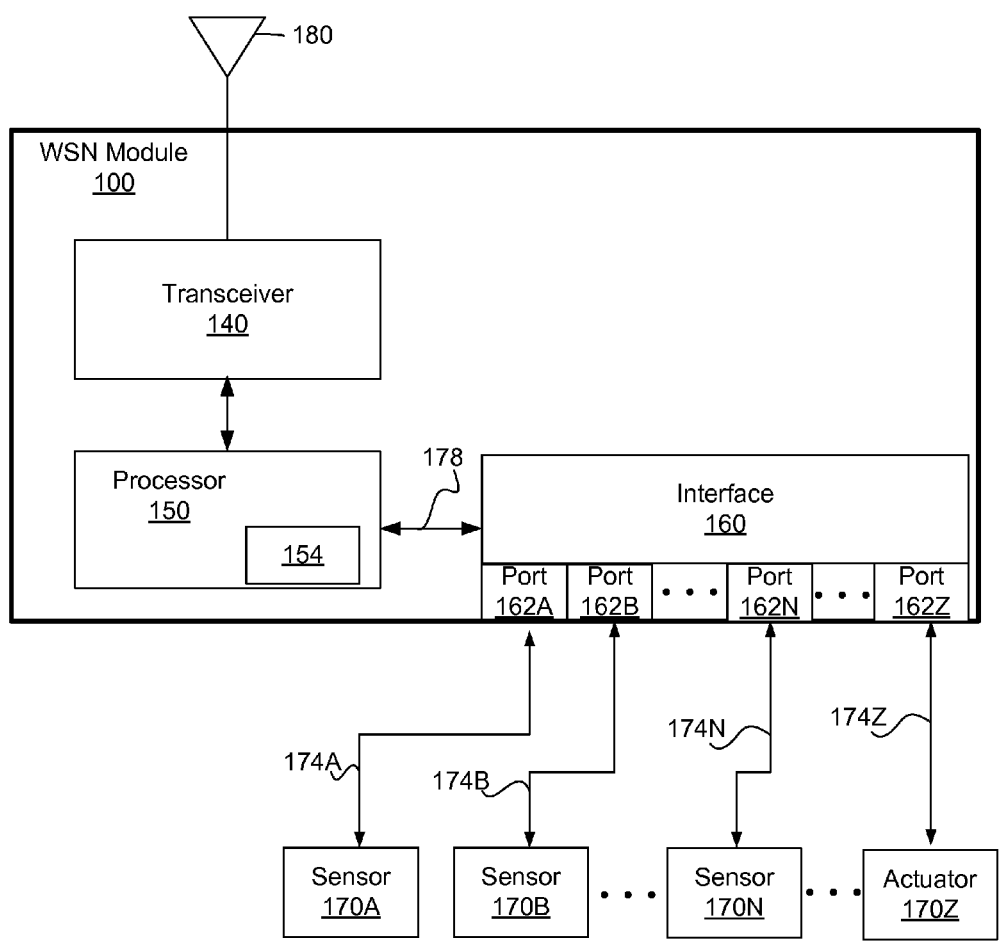
FIG. 1 is a block diagram illustrating a module of a wireless sensor network (WSN), according to one embodiment.

Although embodiments are described herein primarily with reference to modules in a wireless sensor network (WSN) for the sake of explanation, the embodiments may also be employed in other modules of other networks or stand-alone devices. FIG. 1 is a block diagram illustrating a module 100 of a wireless sensor network (WSN), according to one embodiment. The module 100 may include, among other components, a transceiver 140, a processor 150, an interface 160, and an antenna 180. The transceiver 140 is coupled to the processor 150 and the antenna 180 to send wireless signals to other devices or receive wireless signals from other devices. The transceiver 140, the processor 150 and the antenna 180 are well known in the art, and therefore, the description of these components is omitted herein for the sake of brevity. The processor 150 is also coupled to the interface 160 via a bus 178.

The interface 160 is coupled to one or more sensors or actuators 170A through 170Z (hereinafter collectively referred to as the "sensors 170"). Specifically, the interface 160 may include one or more ports 162A through 162Z (hereinafter collectively referred to as the "ports 162"). The ports 162 may be connected to sensors 170 via cable assemblies 174A through 174Z (hereinafter collectively referred to as the "cable assemblies 174"). The combination of each sensor and each cable assembly is hereinafter referred to as a "sensor assembly." The combination of each actuator and each cable assembly is hereinafter referred to as an "actuator assembly." In one embodiment, the interface 160 includes only a single port capable of interfacing with one sensor assembly or one actuator assembly. The sensors or actuators 170 coupled to the interface 160 may be of the same type or of different types.

The processor 150 may include a computer-readable storage medium 154 storing, among other data, instructions for configuring the ports 162 of the interface 160. For example, the computer-readable storage medium 154 may store a table for mapping the sensor information or the actuator information to a combination of control signals for configuring the ports 162. In one embodiment, the computer-readable storage medium 154 is a non-volatile memory device such as an EEPROM (Electrically Erasable Programmable Read-Only Memory) or a flash memory.

In one embodiment, the computer-readable storage medium 154 is a component separate from the processor 150. The computer-readable storage medium 154 communicates with the processor 150 via a bus to perform various operations associated with the module 100.

Example Structure of Sensor Assembly

Figure 2:
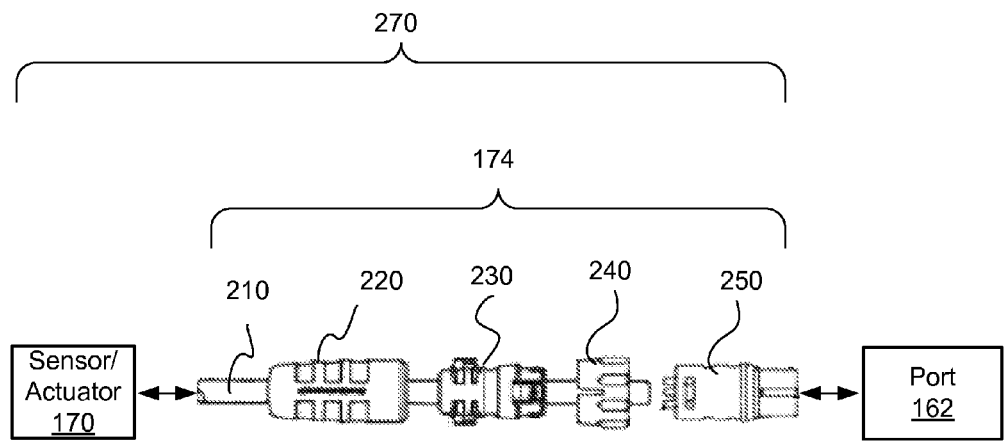
FIG. 2 is a diagram illustrating an assembly for coupling to a port in the module of FIG. 1, according to one embodiment.

FIG. 2 is a diagram illustrating a sensor assembly or an actuator assembly 270 coupled to a port 162 in the module 100 of FIG. 1, according to one embodiment. The sensor assembly or the actuator assembly 270 may include, among other components, a cable assembly 174 and a sensor or actuator 170. In one embodiment, the cable assembly 174 includes, among other components, a cable 210, a cable boot 220, a cable clamp housing 230, a coupling ring 240 and a connector 250. The cable 210 of the cable assembly 174 carries, among others, power to the sensor or actuator 170, sensor signals from the sensor 170 to the port 162 and actuator signal from the module 162 to the actuator 170. In one embodiment, the cable 210 is suitable for outdoor use. The boot 220, the cable clamp housing 230 and the coupling ring 240 are well known in the art, and descriptions of these components are omitted herein for the sake of brevity.

Different sensor assemblies or actuator assemblies installed with different sensors or actuators may be plugged conveniently and promptly onto the port 162 of the module 100. In one embodiment, the sensor assemblies or the actuator assemblies may be connected without opening the module, rearranging jumpers or releasing any securing straps. The module 100 may operate in environment that is not amenable to a time consuming and multi-stepped installation processes. Installing or replacing the sensor assembly or the actuator assemblies by simply plugging into the module allows more convenient and efficient management of the modules and reduced downtime of the module 100. Further, the module 100 automatically detects and reconfigures its interface 160, as described below in detail with reference to FIG. 4. In this way, the need to reprogram or reconfigure the module 100 manually is reduced or minimized.

Figures 3A, 3B:
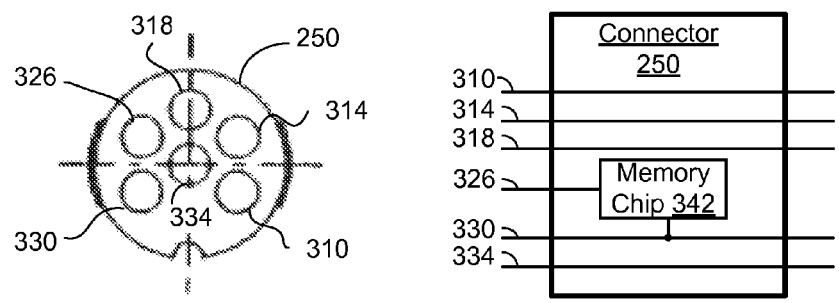
FIG. 3A is a diagram illustrating a pin-out of a connector in the cable assembly of FIG. 2, according to one embodiment.
FIG. 3B is a block diagram illustrating a pin arrangement of the connector of FIG. 3A, according to one embodiment.

FIG. 3A is a diagram illustrating a pin-out of the connector 250 in the cable assembly 270 of FIG. 2, according to one embodiment. The example connector 250 includes six pins 310, 314, 318, 326, 330 and 334 for carrying signals or power between the port 162 and the sensor or actuator 170. As described below with reference to FIG. 4, only a subset of these pins may be active for a certain type of sensors or actuators. Different sets of pins in the connector 250 may be used for carrying signals from different types of sensors or actuators. For example, the pin 334 may carry a digital sensor signal from a smart sensor as well as analog signal from a two-wire sensor or a three-wire sensor. By sharing the pin to carry signals or power between the port 162 and one or more types of sensors or actuators, the connector 250 and its counterpart module 100 may be compatible with more variety of sensors or actuators without increasing the number of pins. Reduced number of pins is advantageous, among other reasons, because the cost for producing the connector 250 may be reduced as well as provide more reliable connections.

In one embodiment, the connector 250 includes a memory chip 342 as illustrated in FIG. 3B. The memory chip 342 stores the sensor information or the actuator information indicating the characteristics of the sensor or actuator 170 in the assembly 270, as described below in detail with reference to Table 1. One pin of the memory chip 342 is coupled to the pin 326 and the other pin of the memory chip 342 is coupled to the pin 330. The sensor information or the actuator information may be stored in the sensor or actuator 170 instead of the memory chip 342 in the connector 250, as described below in detail with reference to FIGS. 6E and 6F.

Figure 4:
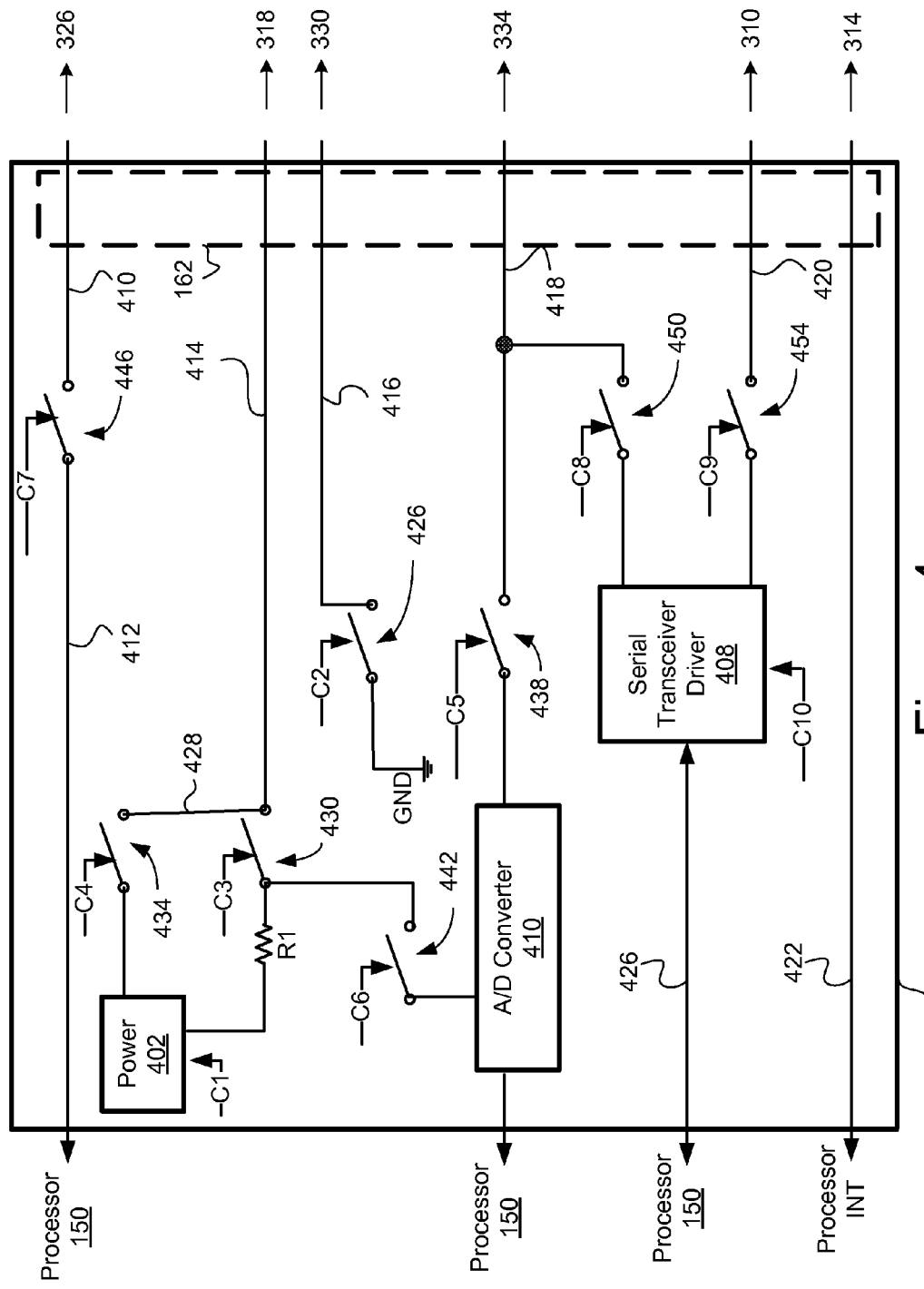
FIG. 4 is a circuit diagram illustrating the interface of FIG. 1, according to one embodiment.

The memory chip 342 may be embodied using various types of memory devices. The memory chip 342 is advantageously a non-volatile memory device to avoid loss of information when power is cut off to the connector 250. Further, the memory chip 342 may be a low power memory device to conserve power in the constrained power source. In one embodiment, the memory chip 342 is embodied as DS 2431 EEPROM manufactured by Maxim Integrated Products, Inc. of Sunnyvale, Calif. One pin of DS 2431 chip is coupled to ground GND via the pin 330, as illustrated in FIG. 4. The other pin of DS 2431 chip is connected to the pin 326 to receive a supply voltage and also send the sensor information or the actuator information to the processor 150. By sharing the supply voltage pin, ground pin and the data pin, the structure of the port 162 may be simplified.

In one embodiment, the memory chip 342 may be included in the connector 250. The memory chip 342 may be included in other components of the assembly 270. For example, the memory chip 342 may be included in the sensor or actuator 170, the boot 220 or the cable clamp housing 230.

In one embodiment, the assembly 270 is sold as a unitary component. The memory chip 342 in the unitary component may be preprogrammed to store the sensor information or actuator information corresponding to the sensor or actuator 170 in the assembly 270. After the assembly 270 is connected to the module 100, the module 100 automatically receives the sensor information or the actuator information, configures the interface 180, and collects the sensor signal or provides the actuator signal. In this way, manual processes for configuring the sensor or actuator 170 to operate with the module 100 may be reduced or minimized.

Example Sensor/Actuator Information Structure

In one embodiment, the memory chip 342 stores the sensor information of the sensor or the actuator information of the actuator according to a sensor/actuator information structure, as set forth in following Table 1.

TABLE 1

| Field | Bytes | Data Type | Description |
|---|---|---|---|
| Header Block | | | |
| BytesHeader | 1 | Char | Number of bytes in the header block. |
| Version | 1 | Char | Version number of this table. |
| Device Block | | | |
| BytesDevice | 1 | Char | Number of bytes in a device block. |
| Device_ID | 2 | Uint (2 Characters) | A numerical identification of the sensor or the actuator. Each supported sensor or actuator is assigned a different Device ID. |
| Serial Number | 6 | Uint (6 Characters) | A unique device serial number of the sensor or the actuator. |
| Lot Code | 2 | Uint | Manufacturing lot code to identify when the sensor or the actuator was manufactured. |
| NOM | 1 | Char | Number of measurements that the sensor can produce. Not applicable to actuators. |
| Measurement/Operation Block | | | |
| BytesMeasure | 1 | Char | Number of bytes in a measurement/operation block. |
| DeviceType | 1 | Char | DeviceType identifies the type of sensor or actuator. 0: resistive sensor 1: three-wire sensor 2: smart sensor 3: pulse generating sensor 4: two-wire sensor 5: powered actuator 6: latching actuator 7: smart actuator |
| InitTime | 1 | Char | Time required for sensor to initialize or warm-up. For a pulse operated actuator, InitTime indicates the minimum length of pulse required for toggling the actuator between modes. |
| MeasureTime | 1 | Char | Time required for sensor to sample and return measurement values. |
| Interrupt | 1 | Char | Interrupt field applicable to pulse type sensors. Upper 4 bits 0: no interrupt capability 1: interrupt on falling edge 2: interrupt on rising edge 3: interrupt on transition Lower 4 bits 0: do nothing on interrupt. 1: perform sensor measurement, forward data to another module on interrupt. 2: perform sensor measurement, hold data to forward the data at the next standard sampling interval. 3: accumulate interrupt counts, transmit |

TABLE 1-continued

| Field | Bytes | Data Type | Description |
|---|---|---|---|
| | | | counts at sampling interval, and then reset the count, |
| | | | 4: accumulate interrupt counts until a predetermined maximum value, forward data after reaching the maximum value, and then reset the count. |
| Power Source | 1 | Char | Indicates the type of power source needed to activate the sensor or actuator. 0: Not used 1: Regulated power source required. 2: Unregulated power source useable. 3: Sensor powered by separate power source. |
| Power Cycle | 2 | Uint | 0: turn on the sensor when making measurement 1 ... 0xFFFE: power on in msec. 0xFFFF: always on. |
| Measure Rate | 2 | Unit | 0: Sensor sends sensor signal autonomously. 1: Module determines sampling rate of the sensor 2 ... 0xFFFE: Sample measurement at a predetermined rate as defined herein. |
| CRC | 2 | Uint | CRC (Cyclic Redundancy Check) of all bytes in sensor information. |

The sensor/actuator information structure includes, among other data blocks, following three distinct data blocks: (i) a header block, (ii) a device block and (iii) a measurement/operation block. The header block includes, for example, metadata about the sensor/actuator information structure including version information of a table associated with the sensor or the actuator. The processor 150 may store one or more versions of tables covering the sensor/actuator information structures in the computer-readable storage medium 154, and retrieve a correct table after receiving the sensor information. The version number may be incremented after any changes are made to the sensor information structure.

The device block in Table 1 includes basic information about the sensors or the actuator. The device block includes, for example, Device_ID field, Serial Number field, a Lot Code field, and a NOM (Number of Measurements) field. Device_ID indicates whether the assembly 270 includes a sensor or an actuator, and also what specific types of sensors or actuators are included in the assembly 270.

Some sensors may produce more than one measurement (e.g., temperature and humidity). The NOM field indicates the number of measurements that the sensor can produce. The NOM field, in conjunction with Device_ID, allows processing of the sensor signal in a manner transparent to the module 100. That is, the module 100 can process and forward the sensor signal to other devices without being reprogrammed to accommodate different sensors. In one embodiment, the module 100 extracts Device_ID and NOM value from the sensor information, generates data packets including Device_ID and NOM value, and send the data packets to a receiving device. For example, the Device_ID indicates that the sensor coupled to the module 100 is a temperature and humidity sensor, and a NOM value of two (NOM=2) indicates that the sensor couple to the module 100 produced sensor signals for two measurements (e.g., temperature and humidity). The module 100 need not store information about which sensors correspond to which Device_ID or what physical properties the measurements represent. Instead, the module 100 merely collects two measurements; includes the two measurements, the NOM value and Device_ID in a message; and forwards the message to a receiving device (e.g., a monitoring module).

The receiving device stores information about which Device_ID corresponds to which sensors, and determines the number of measurements included in the message based on the NOM value. The receiving device processes the sensor signal based on Device_ID and NOM value to a user. In this way, the module 100 can operate with various different types of sensors while processing and storing a minimal amount of data in the module 100.

In one embodiment, the module 100 sends raw measurement data to the receiving device without converting the measurement data to values in physical measuring units (e.g., degrees in Celsius). The receiving device may receive the raw measurement data, and then convert the raw measurement data to a physical measuring unit based on Device_ID received from the module 100. In this way, the processing at the module 100 may be reduced. The reduced processing at the module 100 translates to a longer operational time of the module 100 using constrained energy sources.

The measurement/operation block in Table 1 includes information associated with the sensor signal from the sensor or the actuator signal to the actuator. The measurement/operation block includes, for example, DeviceType field, InitTime field, MeasureTime field, Interrupt field, PowerSource field, PowerCycle, and Sampling Rate field. DeviceType field indicates the type of sensor or actuator being coupled to the module 100. Based on information in SensorType field, the module 100 may configure its port to interface with the sensor. Other information in the measurement/operation block may be used by the module 100 to reduce power consumption associated with taking sensor measurements from the sensor or operating the actuator.

For a sensor, InitTime indicates the time needed to initialize or warm-up the sensor. Based on InitTime, the module 100 may take a measurement shortly after the sensor is placed in a condition for measurement. Power to the sensor may be shut off after taking the measurement. Therefore, InitTime allows the module 100 to conserve power associated with sensors that require initializing or a warm-up time. For a latching actuator, InitTime indicates the length or duration of pulse required to toggle a latching actuator between modes. Latching actuators include actuators that are operated by providing a pulse of signal to operate between two or more modes. In order to minimize the power consumption associated with the operation of the latching actuator, the duration of the pulse needs to be minimized. InitTime for a latching actuator indicates the minimum duration of a pulse needed to switch the modes in the latching actuator. Based on InitTime, the module 100 may provide a pulse of minimum required duration to the latching actuator, reducing the energy consumption associated with the operation of the latching actuator.

Similarly, MeasureTime can be used to provide power to the sensor for the time necessary for sampling and returning measurement values. If it requires prolonged time for sampling and returning measurement values, the module 100 may be placed in a power-save mode and then awakened shortly before the measurement values are to be received. Interrupt may be used for counting pulses from a sensor that generates pulses in response to a predefined external event. There may be prolonged time intervals between pulses in the sensors. Therefore, it may be a waste of energy to keep the module 100 in a power-on mode between the pulses. The module 100 may be placed in a power-save mode between the pulses. The pulse from the sensor may function as an interrupt to the processor 150 and wake-up the processor 150 from the power-save mode. After waking up, the processor 150 may add counts, perform necessary operations (if any), and then resume a power-save mode. Placing the module 100 in the power-save mode and waking up the module 100 intermittently allows the conservation of the constrained power source.

Power Source field indicates the type of power required by the sensor or the actuator to properly operate. If the sensor or the actuator operates by an external power source, the module 100 does not require any power. In such case, energy may be conserved by disabling or disconnecting paths in the interface 160 for providing power from the module 100 to the sensor or the actuator. For sensors or actuators that require power from the module 100, it is energy efficient to provide unregulated power where possible because regulated power consumes energy to regulate the power. Using the information in Power Source field, the module 100 can reduce the energy consumption by choosing the unregulated power when possible.

Power Cycle field includes information when to power the sensors. Based on information in the Power Cycle field, the module 100 may turn off the sensor between measurements, and thereby conserve power when possible.

Measure Rate field indicates how often the measurements should be taken from the sensor. Measure Rate field may indicate whether: (i) the sensor is to send the sensor signal to the module autonomously (value=0), (ii) the module 100 is to determine the sampling rate (value=1) or (iii) the sampling should be taken at a predetermined rate (value=0 through 0xFFFE). By using information in Measure Rate field, the module 100 can interoperate with more diverse types of sensors. Further, by using information in Measure Rate field, the same module 100 can operate with a type of sensor that provides frequent sensor measurements (e.g. irrigation water flow) and also with another type of sensor that provides slowly changing measurements (e.g. deeply buried soil moisture) within the same system.

In one embodiment, various other data fields are added to Table 1. Alternatively, some data fields may be omitted from Table 1 or be substituted with other data fields.

Example Interface Structure

FIG. 4 is a circuit diagram illustrating the interface 160 of FIG. 1, according to one embodiment. The interface 160 may include, among other components, an A/D converter 410, a serial transceiver driver 408, a resistor R1, switches 426, 430, 434, 438, 442, 446, 450, 454, and a power source 402. The interface 160 receives control signals C2 through C10 from the processor 150 via the bus 178 to configure itself according to the sensor information.

The interface 160 may be coupled to sensors providing analog sensor signal, smart sensor providing digital sensor signal and actuators. The A/D converter 410 functions to receive analog sensor signal from the sensor and convert the analog sensor signal into digital data. The A/D converter 140 sends the converted analog sensor signal to the processor 150 via the bus 178. The serial transceiver driver 408 communicates with a smart sensor or a smart actuator via the port 162 to send commands to the smart sensor or the smart actuator. The serial transceiver driver 408 also receives the digital sensor signal from the smart sensor and sends the digital sensor signal to the processor 150 via the bus 178. The control signal C10 controls the serial transceiver driver 408 to place the serial transceiver driver 408 in a receiving mode or a transmitting mode.

The resistor R1 is used for determining a voltage across a resistive sensor 610, as described below in detail with reference to FIG. 6A.

The switches 426, 430, 434, 438, 442, 446, 450, 454 connect or disconnect various components and lines in the interface 160 according to the control signals C2, C3, C4, C5, C6, C7, C8 and C9. The configuration of the interface 160 and its operation responsive to the control signals C2 through C10 are described below in detail with reference to FIGS. 6A through 6E. In one embodiment, the switches 426, 430, 434, 438, 442, 446, 450, 454 are embodied as multiplexers.

The power source 402 functions to power one or more components (e.g., the A/D converter 410) of the interface 160 and the sensor or actuator 170. In one embodiment, the power source 402 operates in two modes: (i) an unregulated power mode and (ii) a regulated power mode. The power source 402 switches between the unregulated power mode and the regulated power mode based on a control signal C1 received from the processor 150 via the bus 178. In the unregulated power mode, the power source 402 is coupled directly to a battery or other constrained power sources to provide unregulated power. In the regulated power mode, the power source 402 is coupled to a regulator to provide a regulated voltage or current to the sensor or the actuator 170. The mode of the power source 402 may be switched depending on the information in the Power Source field of the sensor information, as described above in detail with reference to Table 1. Alternatively, the interface 160 includes two or more power sources including at least (i) an unregulated power source and (ii) a regulated power source. A switch in the interface 160 may be operated by the control switch C1 to couple the sensor 170 to either the unregulated power source or the regulated power source.

The connective relationships of the components and lines in the interface 160 are described herein. A line 410 is connected to the pin 326 of the connector 250 via the port 162. The line 410 is also connected to a line 412 via a switch 446. The line 412 is connected via the bus 178 to the processor 150. A line 414 is connected to the pin 318 of the connector 250 via the port 162. The line 414 is connected to a line 428. The line 428 is connected to a switch 434. The switch 434 is connected to the power source 402. The line 428 is also connected to a switch 430. The switch 430 is coupled to the power source 402 via the resistor R1 and to the A/D converter 410 via the switch 442. A line 416 is connected to the pin 330 of the connector 250 via the port 162. The line 416 is also connected to ground (GND) via a switch 426. A line 418 is connected to a pin 334 of the connector 250 via the port 162. The line 418 is also connected to the A/D converter 410 via a switch 438. The A/D converter 410 is coupled to the processor 150 via the bus 178. The line 418 is also connected to a serial transceiver driver 408 via a switch 450. A line 420 is coupled to the pin 310 of the connector 250 via the port 162. The line 420 is also coupled to the serial transceiver driver 408 via a switch 454. The serial transceiver driver 408 is coupled to the processor 150 via the bus 178. A line 422 is coupled to the pin 314 of the connector 250 via the port 162. The line 422 is also coupled to the processor 150 via the bus 178. The operation of the components and lines of the interface 160 are described below in detail with reference to FIGS. 6A through 6E.

In one embodiment, various other circuit structures are used. For example, the interface may only interface with analog sensors. In such case, the serial transceiver driver 408, switches 450, 454 and lines 426, 420 may be removed from the interface 160. Further, additional components or line may be added to expand types of sensors compatible with the interface 160.

Process of Interfacing Sensor or Actuator

Figure 5:
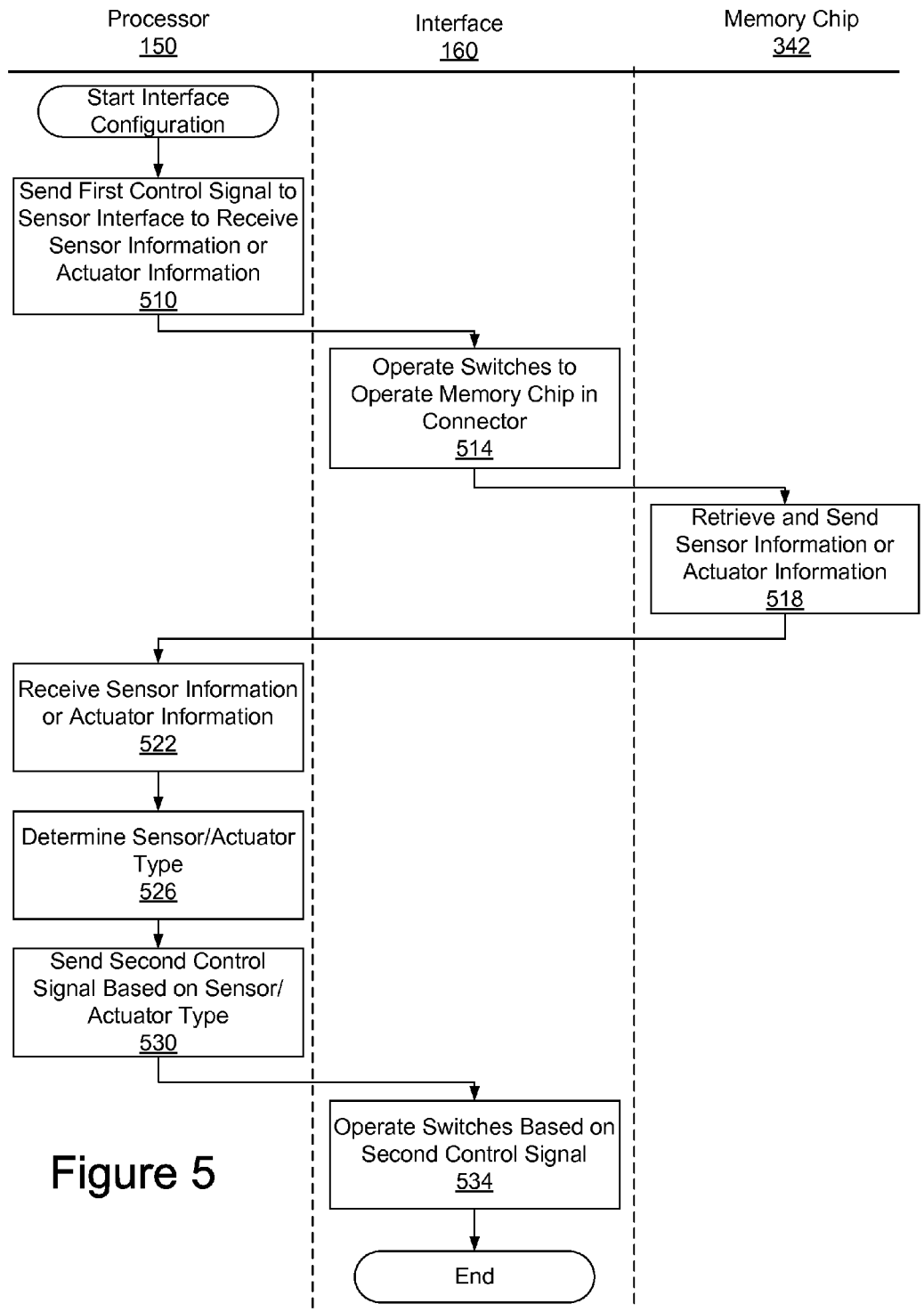
FIG. 5 is a flowchart illustrating the process of configuring the interface of the module based on sensor information or actuator information, according to one embodiment.

FIG. 5 is a flowchart illustrating the process of configuring the interface 160, according to one embodiment. After the assembly 270 is connected to the interface 160, a first control signal is sent 510 from the processor 150 to the interface 160 to receive the sensor information or the actuator information from the memory chip 342 in the assembly 270. The interface 160 operates 514 switches to couple the memory chip 342 to the processor 150. Specifically, the control signals C2 and C7 turn on the switches 426 and 446 in the interface 160. The memory chip 342 is activated by the power provided by connecting the line 412 and the line 410. The memory chip 342 then retrieves and sends 518 the sensor information or the actuator information to the processor 150 via the line 410 and the bus 178. The sensor information or the actuator information includes data fields, for example, as described above with reference to Table 1.

The processor 150 receives 522 the sensor signal. The processor 526 then determines 526 the type of the sensor or actuator based on the sensor information or the actuator information. Specifically, the processor 150 references the tables stored in the computer-readable storage medium 154 to determine the type of the sensor or actuator based on the sensor information or the actuator information. The processor 150 then sends 530 a second control signal to the interface 160 via the bus 178. The interface 160 receives the second control signal and operates 534 the switches according to the second control signal to interface with the sensor or the actuator 170.

The process described above with reference to FIG. 5 is merely illustrative and not restrictive in any sense. For example, the interface 160 may autonomously control switches to power the memory chip 342 and then control switches to receive the sensor information or the actuator information without receiving further control signals form the processor 150.

Operation of Interface According to Different Types of Sensors or Actuators

Figure 6A:
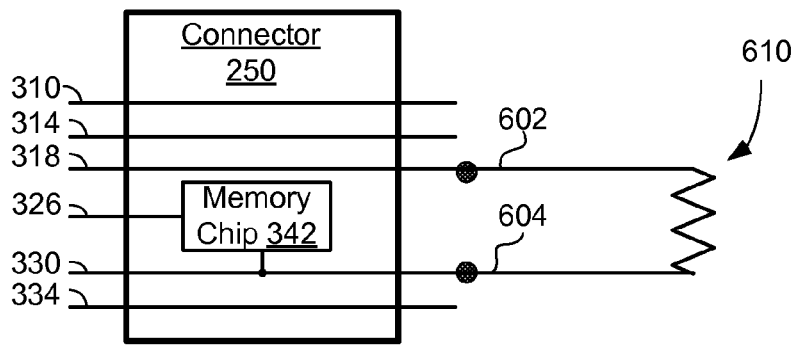
FIGS. 6A through 6E are diagrams illustrating connection of various types of sensors to the interface, according to one embodiment.

FIG. 6A is a diagram illustrating the connection between the resistive type sensor 610 and the connector 250, according to one embodiment. A resistive sensor changes its resistance as a function of a physical property (e.g., temperature). One terminal 602 of the resistive sensor 610 is coupled to the pin 330 and the other terminal 604 of the resistive sensor 610 is coupled to the pin 318.

When the resistive sensor 610 is connected to the interface 160 via the connector 250, the processor 150 sends the control signals C2 and C3 to turn on the switches 426 and 430. The remaining switches are turned off. By turning on the switch 426, one terminal 604 of the resistive sensor 610 is coupled to GND (ground). By turning on the switch 430, the other terminal 602 of the resistive sensor 610 is connected to the power source 402 via the resistor R1. The voltage across the resistor R1 and the voltage across the resistive sensor 610 are proportional to the resistance of the resistor R1 and the resistance of the resistive sensor 610. Therefore, by measuring the voltage across the resistor R1, the resistance of the resistive sensor 610 may be determined.

In one embodiment, the processor 150 sends the control signals to turn on the switch 430 after a predetermined amount of time as specified in InitTime field of the sensor information has passed. After the interval defined in the MeasureTime field of the sensor information, the voltage across the resistor R1 is measured and converted to a digital signal by the A/D converter 410. The A/D converter 410 then sends the converted digital signal to the processor 150.

Figure 6B:
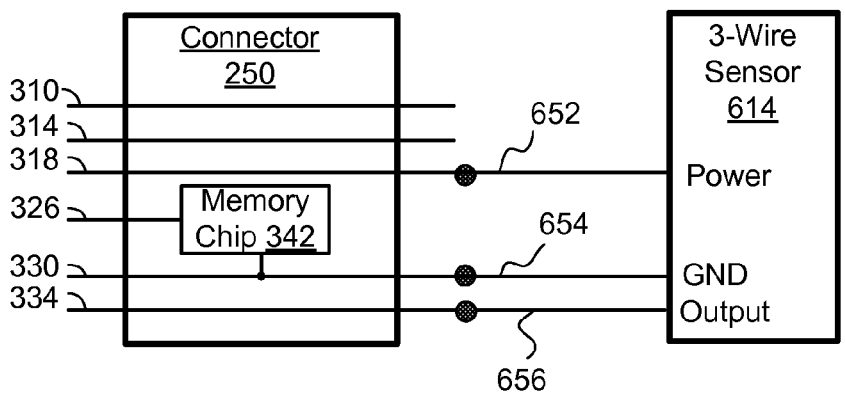

FIG. 6B is a diagram illustrating connecting a three-wire sensor 614 to the connector 250, according to one embodiment. A three-wire sensor includes three pins: (i) a first 652 pin for coupling to a supply voltage, (ii) a second pin 654 for coupling to ground, and (iii) a third pin 656 providing an output in the form of an analog signal. The first pin 652 of the three-wire sensor 614 is coupled to the pin 318 of the connector 250. The second pin 654 of the three-wire sensor 614 is coupled to the pin 330 of the connector 250. The third pin 656 of the three-wire sensor 614 is coupled to the pin 334 of the connector 250.

When the three-wire sensor 614 is connected to the interface 160 via the connector 250, the processor 150 sends the control signals C2 and C4 to turn on the switches 426 and 434. The remaining switches are turned off. By turning on the switches 426 and 434, the three-wire sensor 614 is powered up.

After powering up the three-wire sensor 614 and InitTime as specified in the sensor information has passed, the processor 150 sends a control signal C5 to turn on the switch 438 couple the third pin of the three-wire sensor 614 to the A/D converter 410. After the interval defined in the MeasureTime field of the sensor information, the A/D converter 410 converts the analog signal from the third pin 656 of the three-wire sensor 614 into a digital signal and sends the converted digital signal to the processor 150 via the bus 178.

Figure 6C:
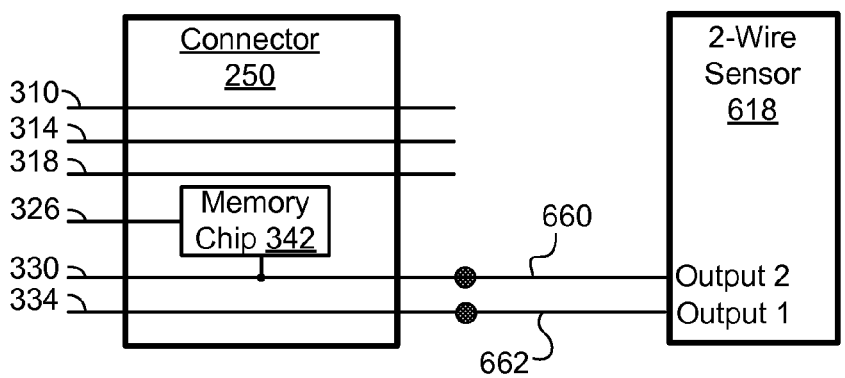

FIG. 6C is a diagram illustrating connecting a two-wire sensor 618 to the connector 250, according to one embodiment. A two-wire sensor includes two pins 660, 662 where the voltage across the two pins 660, 662 is a function of physical property to be measured. The first pin 660 of the two-wire sensor 618 is coupled to the pin 330 of the connector 250. The second pin 662 of the two-wire sensor 618 is coupled to the pin 334 of the connector 250.

When the two-wire sensor 618 is connected with the interface 160 via the connector 250, the processor 150 sends the control signals C2, C5 to turn on the switch 426 and the switch 438. The remaining switches are turned off. By turning on the switch 426, the first pin 660 of the two-wire sensor 618 is grounded. By turning on the switches 438, the second pin 662 of the two-wire sensor 618 is coupled to the A/D converter 410. By measuring the voltage at the A/D converter 410 after the InitTime as specified in the sensor information has passed, the sensor signal of the two-wire sensor 618 may be obtained.

Figure 6D:
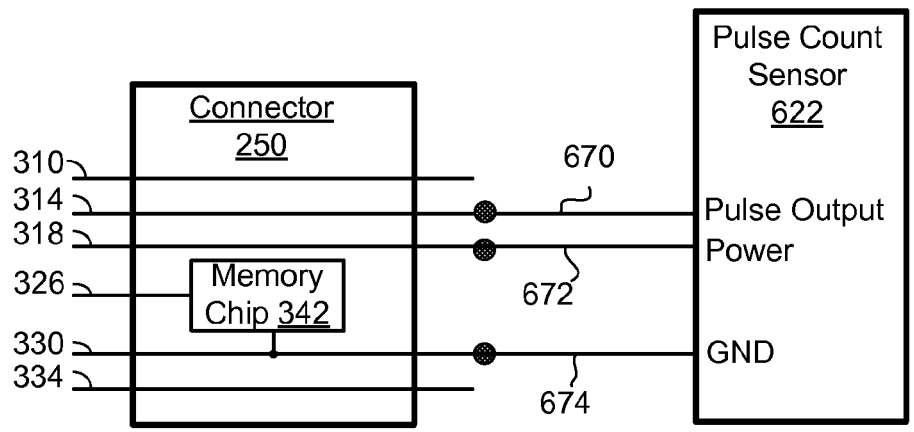

FIG. 6D is a diagram illustrating connecting a pulse count sensor 622 to the connector 250, according to one embodiment. A pulse count sensor generates and outputs a pulse signal each time a predetermined event is detected. By counting the pulses, physical properties can be measured. The pulse count sensor 622 as illustrated in FIG. 6D has three pins: (i) a first pin 670 for coupling to a supply voltage, (ii) a second pin 672 for coupling to ground, and (iii) a third pin 674 for outputting a sensor signal in the form of a pulse signal. The first pin 670 of the pulse count sensor 622 is coupled to the pin 318 of the connector 250. The second pin 672 of the pulse count sensor 622 is coupled to the pin 330 of the connector 250. The third pin 674 of the pulse count sensor 622 is coupled to the pin 318 of the connector 250.

When the pulse count sensor 622 is connected to the interface 160 via the connector 250, the processor 150 sends the control signals C2 and C4 to turn on the switches 426 and 434. The remaining switches in the interface 160 are turned off. By turning on the switches 426, 434, the pulse count sensor 622 is powered up.

The pin 670 of the pulse count sensor 622 outputs the pulse signal. The pulse signal is sent via the pin 314 of the connector 250 to the interrupt input of the processor 150. When the pulse count sensor 622 detects an event and generates a pulse output, an interrupt signal is enabled on the bus 178 to the processor 150. The upper four bits of Interrupt field in the sensor information (described above with reference to Table 1) indicates whether the interrupt signal occurs on a falling edge, a rising edge or both. The lower four bits of Interrupt field indicates what actions should be taken by the module 100 when the interrupt signal is enabled by the pulse count sensor 622. The lower four bits can instruct the module 100 to perform one of the following: (i) do nothing on receiving the interrupt signal, (ii) perform a sensor measurement operation and transmit the sensor signal via the transceiver 140 on receiving the interrupt signal, (iii) perform a sensor measurement operation and store for transmission via the transceiver 140 (as well as transmit the sensor signal at a standard sampling interval, (iv) accumulate counts for the interrupt signal, transmit the counts at sampling interval and reset the count, (v) accumulate counts for the interrupt until a predetermined maximum value, transmit sensor signal after reaching the maximum value, and then reset the count. The standard sampling interval may be defined by the processor 150 independent of the sensor 170 coupled to the module 100.

Figure 6E:
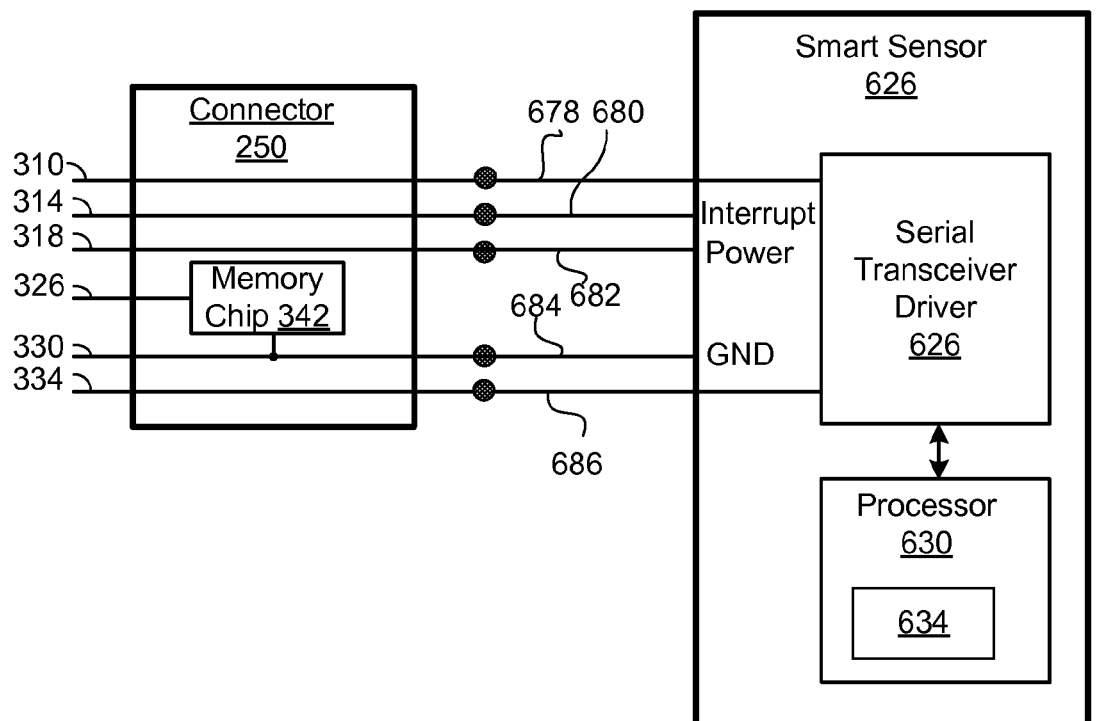

FIG. 6E is a diagram illustrating connecting a smart sensor 626 to the connector 250, according to one embodiment. A smart sensor is a sensor embedded with circuitry that can communicate sensor signal to the module 100 via a communication bus. If a smart sensor includes a processor, the sensor information may be stored and transmitted by the processor in the smart sensor instead of the memory chip. In the example of FIG. 6E, the memory chip 342 provides basic information to the module 100 that the attached sensor is a smart sensor. Further sensor information may then be retrieved and sent by the smart sensor 626.

In one embodiment, the smart sensor 626 includes, among other components, a serial transceiver driver 626 and a processor 630. The data transmission pins 678, 686 of the serial transmission driver 626 are coupled to the pin 310 and the pin 334 of the connector 250. In one embodiment, the serial transmission driver 626 operates in a half duplex mode where the same data transmission pins 678, 686 are used for receiving data from the module 100 and for transmitting data to the module 100. By sharing the data transmission pins 678, 686, the number of pins in the connector 250 and the smart sensor 626 may be reduced. The serial transceiver driver 626 receives commands from the module 100 and sends the received commands to the processor 630. The processor 630 decodes the commands and responds to the commands, if needed, by sending sensor signal or the sensor information to the module 100 via the serial transceiver driver 626. In one embodiment, the processor 630 may include a storage medium 634 (e.g., EEPROM or flash memory) for storing instructions for responding to the commands from the module 100. In one embodiment, the storage medium is a device separate from the processor 630. The storage medium 634 may store, among other information, the sensor information to identify the type of sensor 626 and other characteristics of the sensor 626.

The pin 680 of the smart sensor 626 may also be coupled to the pin 314 of the connector 250 to send interrupt signals to the module 100. The smart sensor 626 also includes a pin 682 for receiving supply voltage (power) and a pin 684 for coupling to ground (GND).

In one embodiment, when the smart sensor 626 is connected with the interface 160 via the connector 250, the memory chip 324 sends basic sensor information that the smart sensor 626 is being connected to the interface 160. In response to receiving the basic sensor information, the processor 150 sends the control signals to turn on the switch 426 (by the control signal C2) and the switch 434 (by the control signal C4). By turning on the switches 426 and 434, the smart sensor 626 is powered up. In addition, switches 450 and 454 are turned on by the control signals C8 and C9 to allow communication to and from the serial transceiver driver 408 of the interface 160. The remaining switches in the interface 160 are turned off. Additional sensor information may be received from the smart sensor 626. The additional sensor information includes additional information not provided in the basic sensor information.

In one embodiment, the sensor assembly 270 for the smart sensor 626 does not include the memory chip 342 or the memory chip 342 is disabled. In this embodiment, the smart sensor 626 provides the sensor information to the module 100. If the module 100 finds no readable memory chip on the assembly 270, the module determines that a smart sensor is coupled and attempts to communicate with the smart sensor. The smart sensor, if coupled, responds with the sensor information.

In one embodiment, the pin 334 of the connector 250 carries voltage signals from analog sensors to the A/D converter 410 as well as digital sensor signal to the serial transceiver driver 408. By sharing the same pin 334 for transmitting the digital sensor signal and analog signals, the number of pins in the connector 250 may be reduced. The reduced number of pins is advantageous, among other reasons, because the production cost of the connector 250 may be reduced and provides more reliable connection.

The connection between the serial transceiver drivers 416, 626 may be established using a differential bus such as RS-485. In order to reduce the number of pins and connections, the RS-485 may operate in a half duplex mode. That is, the same communication pins 678, 686 are used for carrying data between the serial transceiver drivers 416, 626. Alternatively, additional lines and pins may be added to embody full duplex RS-485 communication. In another embodiment, a non-differential communication such as RS-232 may be used for communication between the serial transceiver drivers 408, 626. Using the RS-232 is advantageous because the fewer number of pins are required to communicate in a full duplex mode. However, the communication in the RS-232 is less reliable because the RS-232 does not use a differential pair.

Figure 6F:
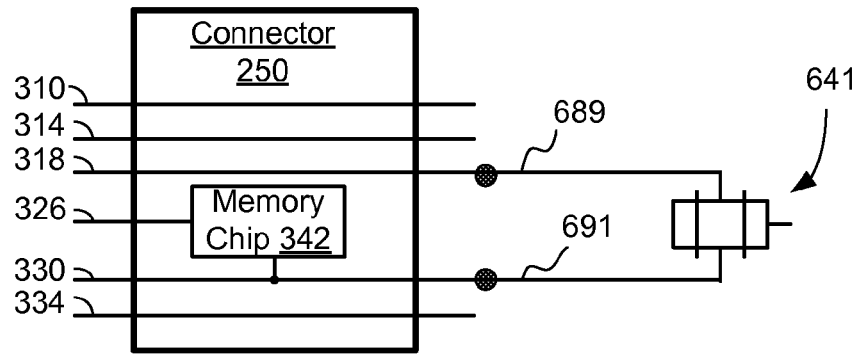
FIGS. 6F through 6G are diagrams illustrating connection of various types of actuators to the interface, according to one embodiment.

FIG. 6F is a diagram illustrating connecting an actuator 641 to the connector 250, according to one embodiment. The actuator 641 may be a powered actuator that requires the supply of continuous power from the module 100 to operate. The powered actuator includes, for example, motors. The actuator 641 may also be a latching actuator that switches between modes responsive to receiving a pulse signal from the module 100. The latching actuator includes, for example, a latching relay.

The pins 689 and 691 of the actuator 641 are connected to the pins 318 and 330 of the connector 250, respectively. When the assembly 270 is coupled to the interface 160, the memory chip 342 sends the actuator information to the processor 150 via the interface 160. Based on Device_ID information in the sensor/actuator information structure, the processor 150 sends control signals C2 and C4 to turn on the switches 426 and 434 of the interface 160. In response, power is supplied from the power source 402 to the actuator 641. The frequency and/or turn-on time to provide power to the actuator 641 may be determined based on the actuator information.

In one embodiment, the information in the Power Source field of the sensor/actuator information structure indicates the type of power needed by the actuator 641. In this embodiment, the processor 150 sends control signal C1 to provide regulated power or unregulated power to the actuator 641 based on the actuator information. To increase power efficiency, unregulated power is used to operate the actuator 641 when possible.

For the latching actuator, information in InitTime field of the sensor/actuator information structure indicates the duration of pulse required to toggle modes of the latching actuator. Based on the information in the InitTime field, the latching actuator is provided with a pulse of minimum duration needed for toggling the modes. In this way, energy consumption associated with actuating the latching actuator may be reduced.

Figure 6G:
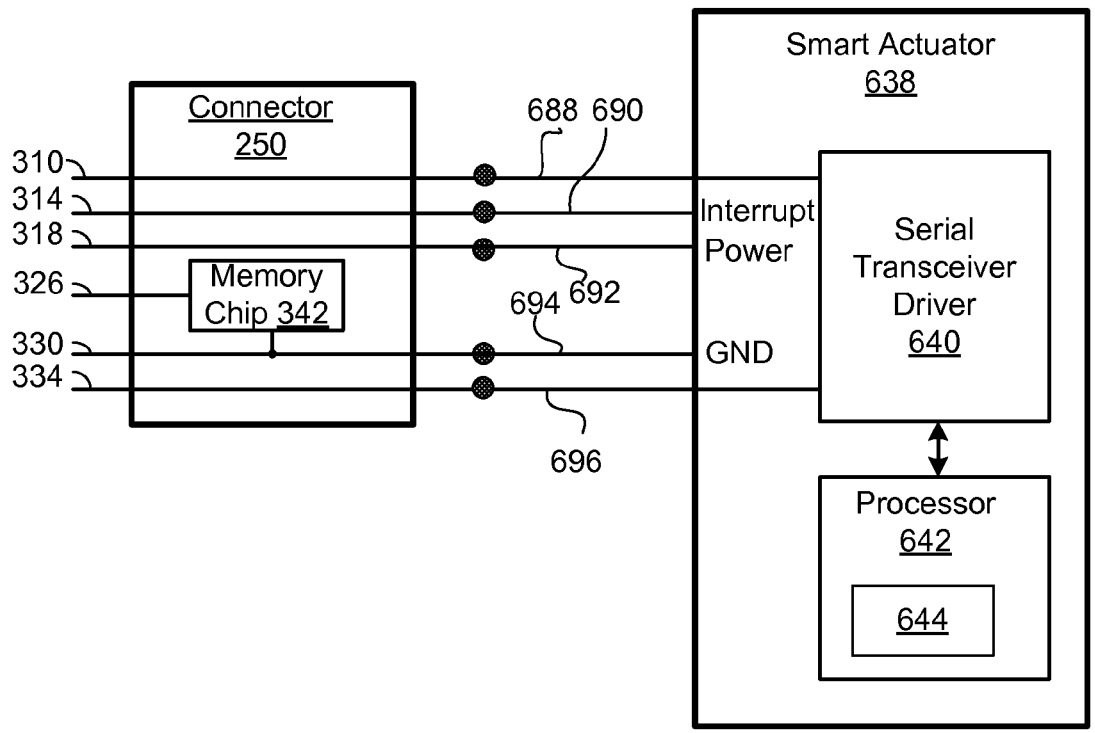

FIG. 6G is a diagram illustrating connecting a smart actuator 638 to the connector 250, according to one embodiment. The smart actuator 638 includes, among other components, a serial transceiver driver 640 and a processor 642. The data transmission pins 688, 696 of the serial transmission driver 640 are coupled to the pin 310 and the pin 334 of the connector 250. As described above with reference to FIG. 6E, the serial transmission driver 640 may operate in a half duplex mode or a full duplex mode. The serial transceiver driver 640 receives actuator signal from the module 100 and sends the received commands to the processor 642. The processor 642 decodes the actuator signal and performs operation according to the actuator signal. In one embodiment, the processor 642 includes a storage medium 644 (e.g., EEPROM or flash memory) for storing instructions for operating according to the actuator signal received from the module 100. In one embodiment, the storage medium is a device separate from the processor 630. The storage medium 634 may store, among other information, the actuator information to identify the type of actuator 638 and other characteristics of the actuator 638.

The pin 690 of the smart sensor 626 may also be coupled to the pin 314 of the connector 250 to send interrupt signals to the module 100. The smart sensor 626 also includes a pin 692 for receiving supply voltage (power) and a pin 694 for coupling to ground (GND).

Protocol for Smart Sensor Communication

In one embodiment, the smart sensor 626 operates in a half-duplex mode using a master/slave protocol. The processor 150 of the module 100 always functions as a master, and the smart sensor 626 functions as a slave. That is, the processor 150 sends commands to the smart sensor 626, and the smart sensor 626 responds to the commands. That is, the smart sensor 626 does not initiate communication without the commands from the processor 150.

In one embodiment, the following command data packet consisting of at least 6 bytes of data is sent from the module 100 to the smart sensor 626:

TABLE 2

| Value | Data Length | Name | Description |
| --- | --- | --- | --- |
| 0x7E | 1 Byte | Framing byte | Special character to designate the start of the command packet. |
| Len | 1 Byte | Data length | Number of data bytes to follow not including CRC. |
| Cmd byte | 1 Byte | | Command number; 256 unique commands can be supported with one byte. |
| parameter 1, parameter 2 | Zero or more Bytes | | Optional command parameters as needed. |
| CRC lo, CRC hi | 2 Bytes | CRC | Two CRC bytes to check integrity of the packet. |
| 0x7E | 1 Bytes | Framing byte | Special character to designate the end of the packet. |

In one embodiment, the module 100 sends a command set forth in the following table to request the sensor information from the smart sensor 626. In this example, Cmd value of 2 indicates that the command is requesting the sensor information.

TABLE 3

| Byte No. | Value | Name | Description |
| --- | --- | --- | --- |
| 1 | 0x7E | Framing byte | Start of packet |
| 2 | 1 | Data length | Number of data bytes to follow |
| 3 | 2 | Cmd | Read Sensor Information |
| 4 | 0x73 | CRC | Low byte of CRC |
| 5 | 0x13 | CRC | Hi byte of CRC |
| 6 | 0x7E | Framing byte | End of byte |

The formats for commands as described in Tables 1 and 2 are merely illustrative. Commands in various other formats may also be used to coordinate communication between the smart sensor 626 and the module 100.

In one embodiment, the smart sensor functions as a master and the module functions as a server. That is, the smart sensor initiates commands to send or receive data to or from the module 100.

In one embodiment, the same information as described in Tables 2 and 3 is used to operate the smart actuator 638.

Process for Interfacing Smart Sensor

Figure 7A:
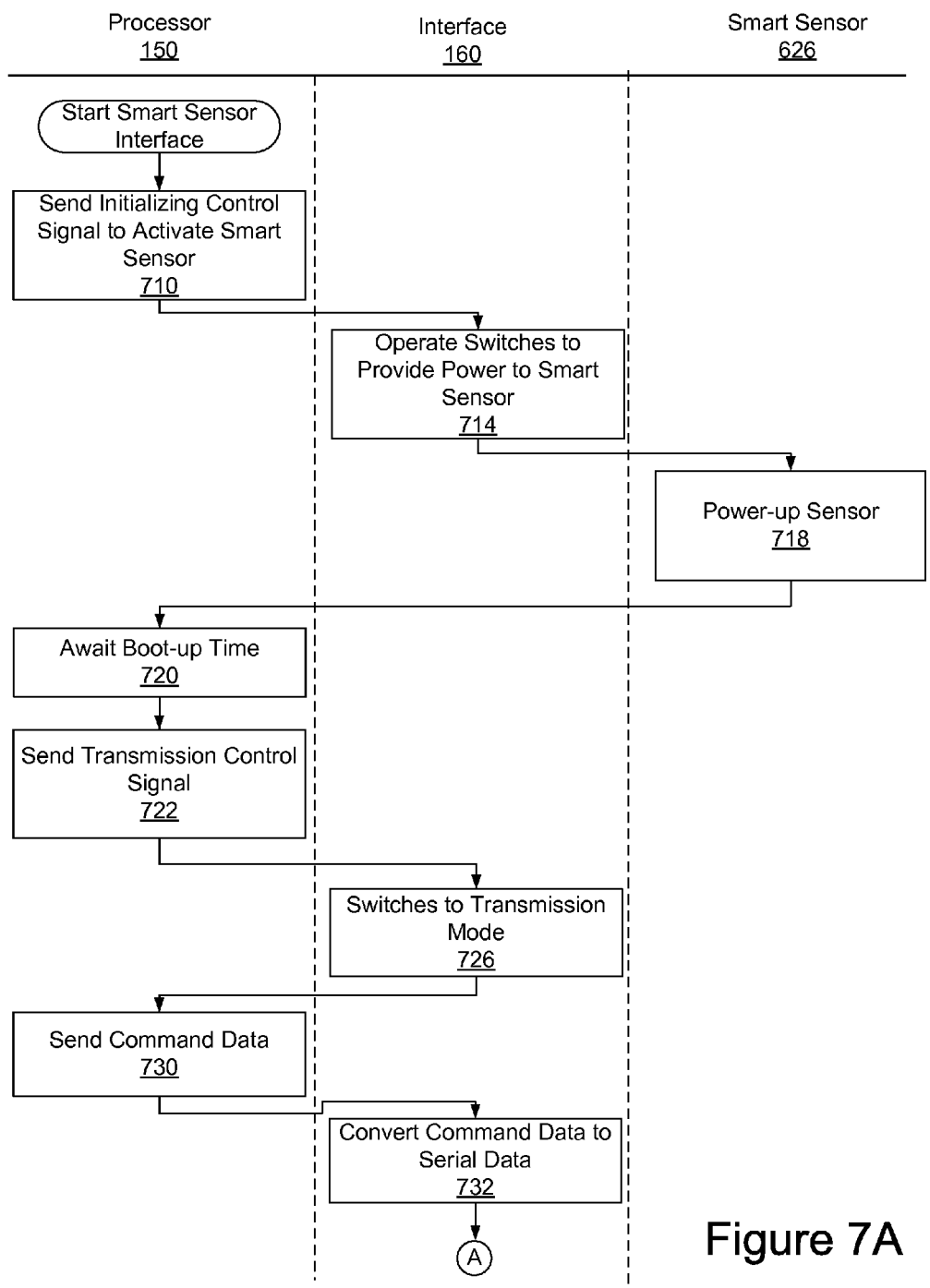
FIGS. 7A and 7B are flowcharts illustrating the process of receiving a sensor signal or the sensor information from a smart sensor, according to one embodiment.
Figure 7B:
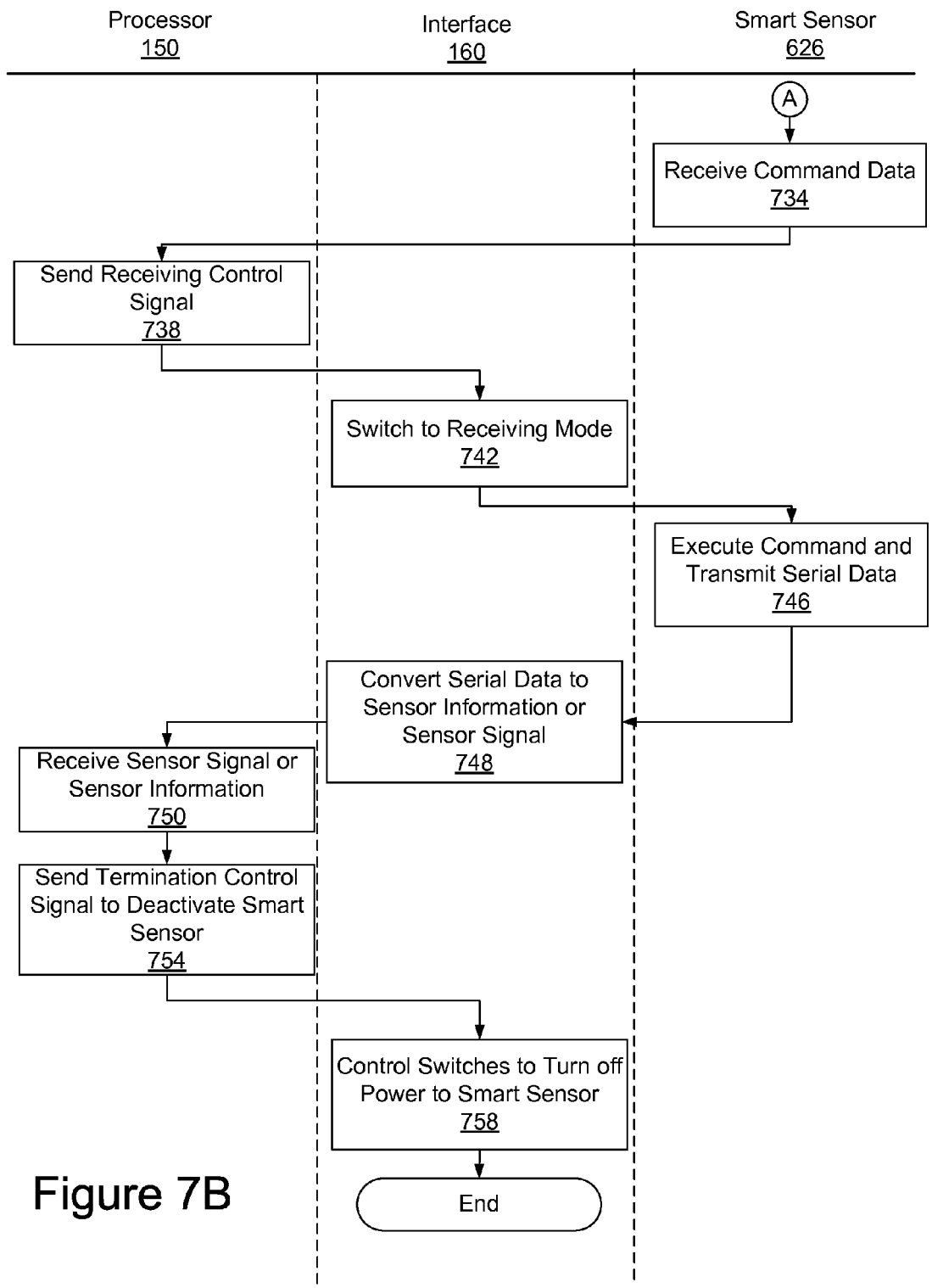

FIGS. 7A and 7B are flowcharts illustrating the process of receiving a sensor signal from the smart sensor 626, according to one embodiment. First, the processor 150 of the module 100 sends 710 an initializing control signal to the interface 160 to turn on the smart sensor 626. The interface 160 then operates 714 its switches to provide power to the smart sensor 626. Referring to FIG. 4, for example, the switches 426 and 434 may be turned on by control signals C2 and C4, respectively. By coupling the power source 402 and ground GND to the pins 318 and 330 of the connector 250, the smart sensor 626 is powered up 718. Also, the serial transceiver driver 408 is activated by turning on switches 450 and 454 using the control signals C8 and C9.

Referring back to FIG. 7A, the processor 150 then waits 720 for the initializing time of the smart sensor 626 to pass. If the processor 150 previously received the sensor information of the smart sensor 626, the initializing time is set by the information in InitTime field. If the initializing time is not yet known because the sensor information was not previously received by the processor 150 or not specified in the sensor information, a sufficient amount of time is given to allow the smart sensor 626 to startup.

The processor 150 sends 722 a transmission control signal C10 to the interface 160. The serial transceiver driver 408 receives the transmission control signal C10 and switches 726 to a transmission mode. The processor 150 then sends 730 command data to the serial transceiver driver 408 via the bus 178. The serial transceiver driver 408 receives the command data and converts 732 the command data into serial data for transmission over the data path. The data path includes a first pin 678 of the smart sensor 626 connected to the pin 310 of the connector 250 and the pin 686 of the smart sensor 626 connected to the pin 334 of the connector 250. The serial data is transmitted over the data path to the smart sensor 626, and the smart sensor 626 receives 734 the command data 734.

After sending the command data, the processor 150 then sends 738 a receiving control signal C10 to the interface 160. In response to receiving the control signal C10, the serial transceiver driver 408 switches 742 to a receiving mode.

The smart sensor 626 executes commands and transmits 746 the sensor information or the sensor signal in serial data to the interface 160 via the data path. The interface 160 converts 748 the serial data received from the smart sensor 626 into the sensor information or the sensor signal and sends the serial data to the processor 150. The processor 150 receives 750 the sensor signal or the sensor information. In one embodiment, the processor 150 waits for a time as set by the information in MeasureTime field of the sensor information. If the response from the smart sensor 626 is not received after MeasureTime, the processor 150 may resend the command data or terminate the process to conserve energy. If no sensor information was previously received, a long MeasureTime may be set to allow sufficient time for receiving a response from the smart sensor 626.

After the data is received from the smart sensor 626, the processor 150 sends 754 a termination control signal to the interface 160 to deactivate the smart sensor 626. The termination control signal controls 728 the interface 160 to turn off the switch 434 and/or the switch 426 to shut off power from the power source 402, as determined by the information in PowerCycle field of the sensor information. Then the process terminates.

The steps need not be performed in the sequence as illustrated in FIGS. 7A and 7B. Some steps of FIGS. 7A and 7B may be performed simultaneously. For example, receiving 734 the command data at the smart sensor 626 may be performed in parallel with sending 738 the receiving control signal at the processor 150. Further, some sequences in steps of FIGS. 7A and 7B may be reversed in sequence. For example, awaiting 720 initializing time may be performed after sending 722 the transmission control signal.

The interface may be compatible with more or fewer types of sensors. For example, the interface may not be compatible with a smart sensor. The number of pins in the connector may change according to the types and numbers of sensors compatible with the interface. The pins in the connector may also be increased to accommodate more types of sensors or decreased to accommodate fewer types of sensors.

In one embodiment, the interface is employed in a module that communicates by wired communication with other modules. Alternatively, the interface may be used in a module that is capable of communication with other modules using two or more communication methods.

Embodiments may include software elements or modules. For example, the computer-readable storage medium 154 or the storage medium 634 may store instructions for processes that are written or coded as instructions using a programming language.

Therefore, the method and apparatus provides, among other benefits, (i) extended operational time by managing power consumption, (ii) interfacing with various types of sensors, (iii) efficient and prompt coupling of modules to different types of sensors.

What is claimed is:

1. A module for interfacing with more than one type of sensor or actuator, the module comprising:
    a module interface configured to couple to a first assembly including a sensor or an actuator, the module interface configured to receive assembly information from the coupled assembly, the assembly information comprising one of: sensor information representing characteristics of a sensor in the first assembly or actuator information representing characteristics of an actuator in the first assembly; and
    a processor coupled to the module interface, the processor configured to:
        receive the assembly information from the first assembly via the module interface;
        determine whether the assembly information is sensor or actuator information;
        generate a sensor interface control signal for configuring the module interface for a sensor if the assembly information is determined to be sensor information;
        generate an actuator interface control signal for configuring the module interface for an actuator if the assembly information is determined to be actuator information; and
        send the generated sensor control signal or the generated actuator control signal to the module interface to configure the module interface for the sensor or the actuator, respectively, in the first assembly.

2. The module of claim 1, wherein the first assembly comprises a first sensor configured to generate an analog module signal, and the sensor interface is configured to couple to a second assembly comprising a second sensor configured to generate a digital sensor signal.

3. The module of claim 1, wherein the module interface comprises a plurality of switches, each of the plurality of switches turned on or off responsive to receiving either the sensor or actuator control signal.

4. The module of claim 1, wherein the sensor information or the actuator information comprises power source information representing a type of power source required for operating the sensor or the actuator, respectively, in the first assembly.

5. The module of claim 1, where the sensor information comprises:
    sensor type information representing a type of sensor corresponding to the sensor in the first assembly;
    sensor initialization information representing a time required for initializing the sensor in the first assembly; and
    sensor measure time information representing a time required for the sensor to return a sensor signal.

6. The module of claim 1, where the actuator information comprises:
    actuator type information representing a type of actuator corresponding to the actuator in the first assembly; and
    actuator initialization information representing a duration of a pulse for switching a mode of the actuator.

7. The module of claim 6, wherein the processor is further configured to:
    determine a sensor power duration to provide power to the sensor or determine an actuator power duration to provide power to the actuator based on the sensor initialization information or the actuator initialization information, respectively; and
    control the module interface to provide power to the sensor or the actuator for the determined respective duration.

8. The module of claim 1, wherein the sensor information comprises sensor measure rate information representing how often measurements should be sampled by the sensor.

9. The module of claim 1, wherein the sensor is configured to generate a sensor pulse signal responsive to detecting a predetermined event.

10. The module of claim 9, wherein the processor is configured to wake up from a power-save mode responsive to receiving the sensor pulse signal.

11. The module of claim 1, wherein the module interface comprises a serial transceiver driver configured to communicate with the sensor of the first assembly in a half duplex mode.

12. The module of claim 1, wherein the first assembly comprises a memory chip configured to store the sensor information, the memory chip configured to transmit the sensor information to the module interface responsive to the first assembly being coupled to the module interface.

13. The module of claim 1, wherein the first assembly comprises a connector, the connector comprising at least one pin shared for transmitting the sensor signal for a first sensor and a second sensor.

14. A method for interfacing with more than one type of sensor or actuator in a module, comprising:
- receiving assembly information responsive to coupling a first assembly including a sensor or an actuator to the module, the assembly information comprising one of: sensor information representing characteristics of the sensor in the first assembly or actuator information representing characteristics of the actuator in the first assembly;
- determining whether the assembly information is sensor or actuator information;
- generating a sensor interface control signal responsive to determining the assembly information is sensor information;
- generating an actuator interface control signal responsive to determining the assembly information is actuator information;
- configuring an interface in the module based on either the sensor interface control signal or the actuator interface control signal; and
- receiving, at the interface, either a sensor signal from the sensor in the first assembly or an actuator signal from the actuator in the first assembly responsive to configuring the interface.

15. The method of claim 14, wherein the sensor comprises a first sensor generating an analog sensor signal, and a second sensor generating a digital sensor signal.

16. The method of claim 14, further comprising turning on or off switches in the module interface responsive to receiving either the server interface control signal or the actuator interface control signal.

17. The method of claim 14, wherein the sensor information comprises power source information representing a type of power source required for operating the sensor.

18. The method of claim 14, where the sensor information comprises:
- sensor type information representing a type of sensor corresponding to the sensor in the first assembly;
- sensor initialization information representing a time required for initializing the sensor in the first assembly; and
- sensor measure time information representing a time required for the sensor to return the sensor signal.

19. The method of claim 18, further comprising:
- determining a sensor power duration to provide power to the sensor based on at least one of the sensor initialization information or the sensor measure time information; and
- providing power to the sensor for the determined sensor power duration.

20. The method of claim 14, wherein the actuator information comprises:
- actuator type information representing a type of actuator corresponding to the actuator in the first assembly; and
- actuator initialization information representing duration of a pulse for switching a mode of the actuator.

21. The method of claim 14, wherein the sensor information comprises measure rate information representing how often measurements should be sampled by the sensor.

22. The method of claim 14, further comprising receiving a sensor pulse signal from the sensor responsive to detecting a predetermined event.

23. The method of claim 22, further comprising waking up a processor in the module responsive to receiving the sensor pulse signal as an interrupt signal of the processor.

* * * * *